United States Patent [19]
Mita

[11] 3,964,082
[45] June 15, 1976

[54] CAMERA AUTO/MANUAL EXPOSURE CONTROL SELECTOR DIAL ASSEMBLY

[75] Inventor: Kunio Mita, Kamifukuoka, Japan

[73] Assignee: Asahi Kogaku Kogyo Kabushiki Kaisha, Tokyo, Japan

[22] Filed: Nov. 20, 1974

[21] Appl. No.: 525,459

[30] Foreign Application Priority Data
Nov. 21, 1973 Japan.......................... 48-133693[U]

[52] U.S. Cl................................ 354/289; 116/114 J
[51] Int. Cl.²........................................ G03B 17/00
[58] Field of Search .......................... 354/288–289, 354/47, 48, 270, 272, 354; 116/129 R, 129 F, 129 S, 129 N, 133, 114 J; 74/531, 553, 10 R, 10.41; 334/88

[56] References Cited
UNITED STATES PATENTS
2,612,093  9/1952  Schutz ................................. 354/272

Primary Examiner—L. T. Hix
Assistant Examiner—James LaBarre
Attorney, Agent, or Firm—Christie, Parker & Hale

[57] ABSTRACT

A selector dial assembly includes a rotatable indicator dial that is releasably locked at an angular position for setting the camera in an automatic exposure control mode (AUTO). To release the lock, a pin slidably engaged with a hole in the dial is manually depressed so as to disengage a portion of the pin from a notch in a fixed member. After releasing the lock, the dial is manually rotatable to select a desired exposure setting (MANUAL). The pin is resiliently urged to return into locking engagement automatically upon rotation of the dial to AUTO.

2 Claims, 4 Drawing Figures

CAMERA AUTO/MANUAL EXPOSURE CONTROL SELECTOR DIAL ASSEMBLY

BACKGROUND OF THE INVENTION

This invention relates to an exposure control selector dial assembly for a camera that is operable in either an automatic exposure control mode or a manual mode in which the photographer preselects a desired exposure.

It is known to provide a camera with exposure control mechanisms that are settable to operate in either AUTO or MANUAL modes. When set in the AUTO mode, the photographer does not need to make any decision as to what combination of f stop and shutter speed is appropriate under prevailing lighting conditions. When set in MANUAL, the photographer can select a desired exposure on his own. Under certain kinds of lighting conditions, as where the subject is backlighted, it is advisable for the photographer to select a shutter speed manually. However, more typically, photographers tend to use the AUTO mode.

To enable the photographer to switch between these modes, a selector dial assembly is provided. One of the difficulties encountered with the prior art arrangements is as follows. Occasionally, the selector dial is inadvertently rotated from the AUTO setting to one of the manual settings, and the photographer is unaware of this when he takes a picture. In all likelihood, the resulting photograph will then be improperly exposed. No satisfactory means which is operative to eliminate this problem with certainty has been proposed heretofore.

SUMMARY OF THE INVENTION

This invention is directed to eliminating the foregoing problem by providing for releasably locking a selector dial at an angular position in which the camera is set to the AUTO mode.

The present invention is embodied in a camera and includes an indicator dial and means for rotatably securing it to the camera body. The indicator dial has a hole radially spaced from its axis of rotation and a surface with exposure setting indicia thereon. A stationary member has a notched marginal end portion. Means affix the stationary member to the camera body with the notched marginal edge portion being radially spaced from said axis of rotation. An elongated pin is slidably engaged in the hole and means resiliently urge it to slide in a longitudinal direction. The pin includes locking means operative when the dial is rotatably oriented at a predetermined angular position to respond to the urging of the biasing means to slide into engagement with the notched marginal end portion so as to cause the dial to be releasably locked at the predetermined angular position.

The positive locking engagement between the pin locking means and the notched marginal end portion can be seen to be different from arresting means whose purpose is to prevent the possibility that the dial will be left at an angular orientation between two discrete settings. In the preferred embodiment, such arresting means are provided as well and, advantageously, the same stationary member plays a role in providing this arresting function.

Preferably, the means for rotatably securing the dial includes a shaft affixed to the camera body, and the stationary member is a generally flat disk affixed to the shaft to lie in a plane parallel to and spaced from the indicia bearing surface. The portion of the disk which is on the side of the shaft opposite the notch cooperates with a leaf spring to provide the arresting means. Other preferred features of the invention claimed herein are described in detail below.

DETAILED DESCRIPTION

Figure 1:
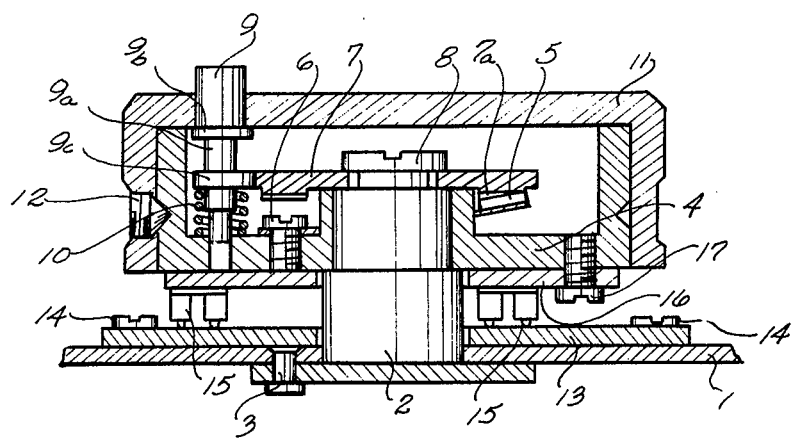
FIG. 1 is a sectional view which is directed to the preferred construction of this invention and which illustrates the relative position of cooperating parts while the AUTO mode is selected.

A base plate 1 shown in FIG. 1 is securely attached to a camera body not shown. A generally cup-shaped indicator dial 11 has a surface with exposure setting indicia thereon (i.e., AUTO, 1000, etc., see FIG. 2).

Means are provided for rotatably securing the indicator dial 11 to the camera body. To this end, a selector dial shaft 2 is fixed to the base plate 1 by a rivet 3. The shaft 2 is stepped to provide an annular shoulder. A generally cup-shaped selector ring 4 has its flat bottom center portion rotatably supported by the shaft 2. The annular shoulder of the shaft 2 keeps the ring 4 spaced axially away from the camera body. The cylindrical wall portion of the ring 4 projects outwardly from the camera body. The indicator dial 11 is capped around this cylindrical wall portion. To this end, a V-shaped groove is provided in the outer surface of the cylindrical wall portion of the ring, and a hole is provided in the cylindrical wall portion of the indicator dial 11. A set screw 12 fits through this hole so that its pointed end engages the groove.

Figure 2:
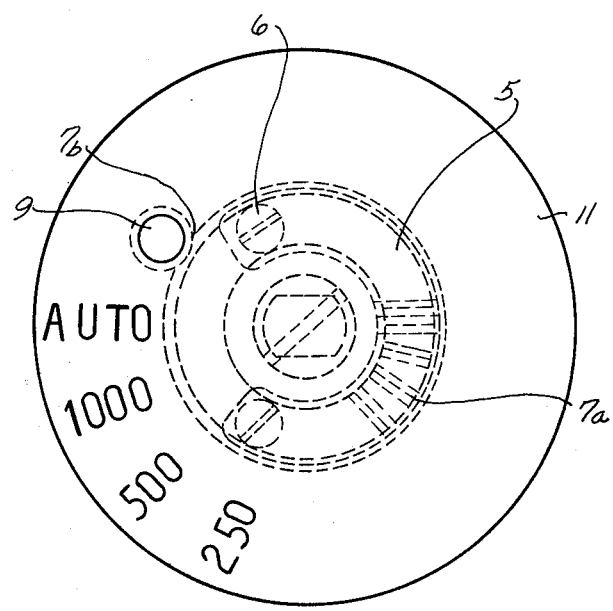
FIG. 2 is a plan view corresponding to FIG. 1.

A horse-shoe shaped leaf spring 5 is fixed at its opposite ends to the flat bottom portion of the ring 4 by a pair of screws 6 (FIG. 2). The leaf spring 5 partially surrounds the shaft 2, and is oriented to lie in a plane tilted with respect to the flat bottom portion. The upper end portion of the shaft 2 is chamfered as best shown in FIG. 2 at diametrically opposite positions to form a generally oval end portion.

A generally disk-shaped stationary member 7 has a central hole into which the generally oval end portion is fitted. A plurality of radially extending click grooves 7a best shown in FIG. 2 are provided on the lower surface of one portion of the stationary member 7. When the photographer rotates the dial assembly, the leaf spring 5 engages and disengages the grooves 7a to facilitate the manual setting to a desired discrete angle.

As best shown in FIG. 2, a notched marginal end portion 7b of the stationary member 7 is radially spaced from the axis of the shaft 2, which defines the axis of rotation of the indicator dial 11.

An elongated pin 9 is slidably engaged in a hole in the upper central portion of the indicator dial 11, this hole being also radially spaced from the axis of rotation so that the pin 9 revolves around this axis as the dial is rotated. The pin 9 includes locking means operative when the indicator dial 11 is rotatably oriented at a predetermined angular position to respond to the urging of biasing means to slide into engagement with the notched end portion 7b so as to cause the dial to be releasably locked at the predetermined angular position. Preferably, the locking means includes a pair of axially spaced-apart flanges 9b and 9c. An expansion coil spring 10 disposed between the flange 9c and the ring 4 forms the biasing means.

A printed circuit board 13 for supporting electromechanical circuit elements such as switches and other circuit elements such as conversion resistors for the exposure control circuit means of the camera is securely attached to the base plate 1 by set screws 14. An insulator plate 16 is fixed, by a set screw 17, to the ring 4 on the side opposite to the side where the leaf spring 5 is mounted. On the bottom surface of the insulator plate 16 facing towards the printed circuit board 13, there is mounted a slider 15 so that it is in a slidable contact with the printed circuit board 13 so that switches thereon respond to the information represented by the angular orientation of the indicator dial 11.

Now the operation of the foregoing construction will be described. When the indicator dial 11 is set in the automatic exposure control position (AUTO) as shown in FIGS. 1 and 2, the flange 9c of the pin 9 is portionally engaged into the notched portion 7b and the lock pin 9 is pushed upwardly by the expansion spring 10 until the flange 9b abuts the indicator dial 11. Thus, the pin 9 will be arrested by the fixed member 7, and the selector dial 11, into which one end of the lock pin 9 is slidably engaged, will be locked so as not to be rotatable around the shaft 2.

Figure 3:
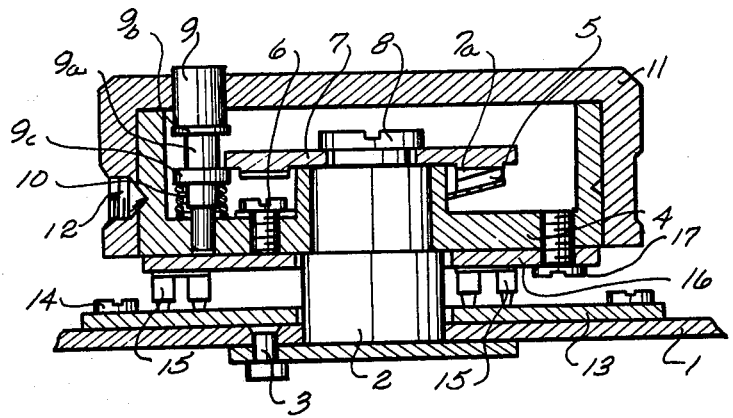
FIG. 3 is a sectional view which illustrates the relative position of cooperating parts while the MANUAL mode is selected.
Figure 4:
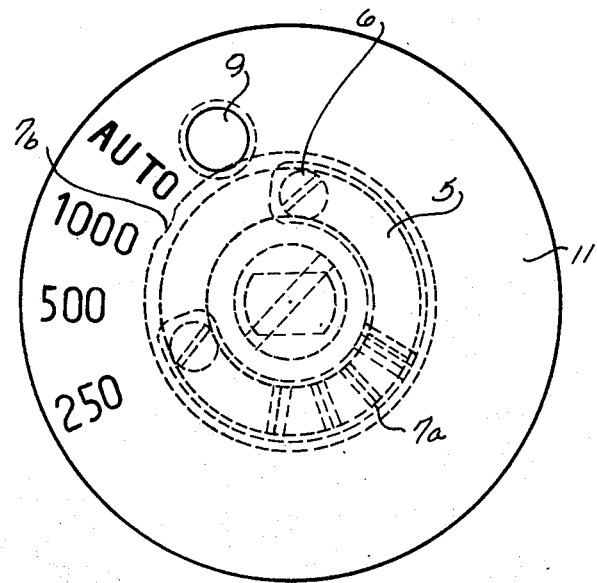
FIG. 4 is a plan view corresponding to FIG. 3.

To change the setting of the device from auto to manual exposure control, the pin 9 is manually depressed against the urging of the spring 10 until the top surface of the flange 9c reaches a lower level than the bottom surface of the stationary member 7. This releases the locked indicator dial 11. Under these lock released conditions, the indicator dial 11 is manually rotatable so as to set it in any desired angular position. (It should be noted that during the dial setting operation the photographer need not continuously hold the pin 9 in its depressed position with his finger.) Since the top end portion of the pin 9 projects upwardly above the top surface of indicator dial 11, the foregoing operations may be effected with three fingers. FIGS. 3 and 4 illustrate the device in the manual exposure control position. After the pin 9 has been depressed and the indicator dial 11 has been rotated, the peripheral edge of the stationary member 7 projects into a reduced diameter portion 9a of the pin 9. In this position, the pin 9 does not translate in response to the upward urging action of the expansion coil spring 10 because it is arrested by the engagement of top surface of the flange 9c with the outer peripheral bottom surface of stationary member 7 and thus is held in its depressed, or lock released position. Thus, the integral movable assembly consisting of the ring 4, the pin 9 and the dial 11 is settable to any desired predetermined angular position through the click engagement of leaf spring 5 with the radial click grooves 7a formed in the fixed member 7. This in turn will permit the slider 15 to be set in any desired position on the printed circuit board 13.

To reset the device from manual to auto exposure control position, the dial 11 is simply rotated to the auto position. In this position the notched portion 7b of the fixed member 7 is aligned with the pin 9, so that the latter is pushed up by the action of expansion coil spring 10 and locked upon engagement of the flange 9c into the notched portion 7b.

It will be understood from the foregoing that the device of this invention is simple in construction and requires relatively few components, permitting the manufacture of the device in a simplified manner at a low cost. The arrangement of the top end portion of the pin 9 projecting above the top surface of the dial 11 permits an auto/manual exposure control selecting operation with a single hand in a much simplified manner. In addition, the auto to manual switching can be effected only through intentional operation procedures by the photographer. This eliminates any possible danger of the camera being unintentionally switched over from auto to manual exposure control operation, which is often encountered in conventional cameras when the selector dial is rotated unintentionally, and therefore eliminates the danger of photographing failure due to an error exposure.

While the invention has been described hereinbefore with reference to the details of a single embodiment, such described details are to illustrate the principles underlying the invention, and it is to be understood that various modifications may be made without departing from the spirit of this invention. For example, although the pin 9 is provided with a pair of flanges, it is possible within the spirit of this invention to replace the upper one of the flanges of the pin 9 by a stepped shoulder of the pin. It will be known that the function of the upper flange of the lock pin 9 and that of the stepped shoulder formed in the upper portion of the pin 9 are the same within this invention. That is, this part, whether the upper flange or the stepped shoulder, is only abutting against the dial 11 by the resilient force of the coil spring 10 when the dial 11 is in the auto exposure control position, and in this position, the upwardly projecting movement of the pin 9 is limited.

What is claimed is:

1. A selector dial assembly in a camera that is operable in either an automatic exposure control mode or a manual mode in accordance with a setting of the dial assembly, wherein the selector dial assembly comprises:

an indicator dial, and means for rotatably supporting it on the camera body, the indicator dial having a hole radially spaced from its axis of rotation, and a surface with exposure setting indicia thereon;

a stationary member having a notched marginal end portion, and means for affixing the stationary member to the camera body with the notched marginal end portion radially spaced from said axis of rotation;

an elongated pin including an end portion and a locking means portion, the locking means portion including first and second axially spaced-apart flanges and a reduced diameter portion therebetween, the pin having a lock position and a release position and being slidably engaged in the hole so that it can slide between its lock and release positions, the end portion of the pin being positioned out of the hole when the pin is in its lock position so as to be accessible to be manually pushed to force the pin toward its release position;

means for resiliently urging the pin to slide in a longitudinal direction from its release position to its lock position; and the pin being operative when the dial is rotatably oriented at a predetermined angular position to respond to the urging of the biasing means to slide to its lock position. automatically and bring the first flange of the locking means into abutting engagement with the indicator dial and bring the second flange of the locking means into engagement with the notched marginal end portion so as to cause the dial to be locked at the predetermined angular position until the pin is deliberately pushed to its release position to disengage the locking means from the notched marginal end portion to enable manual rotation of the dial.

2. The assembly of claim 1 wherein the stationary member comprises a generally disk-shaped member oriented in a plane parallel to and spaced between the camera body and the indicia bearing surface, the disk-shaped member defining a surface against which the second flange abuts as the pin revolves around the axis.

* * * * *